March 19, 1940.  M. E. BENNETT  2,194,415
BURGLAR TRAP
Filed April 27, 1938   3 Sheets-Sheet 3
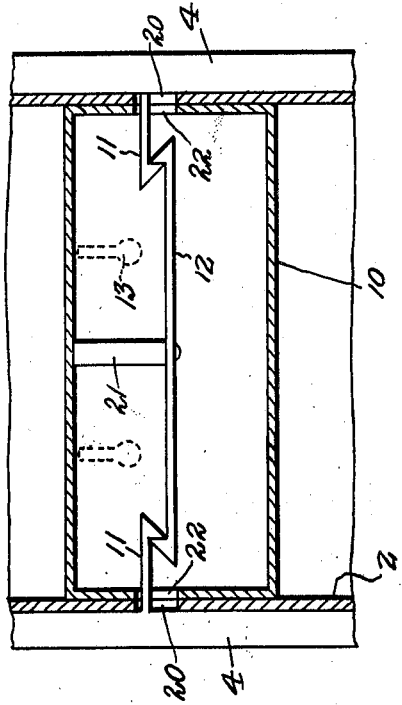
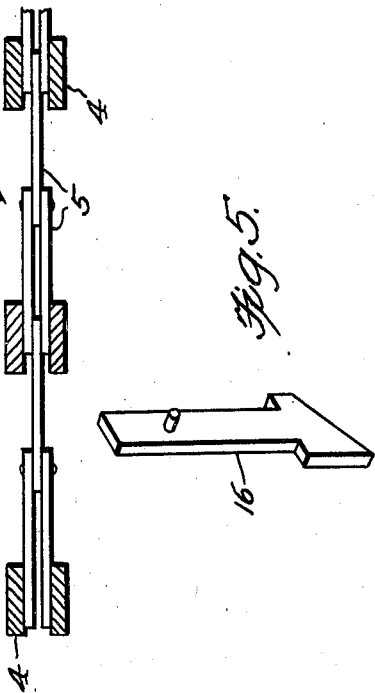
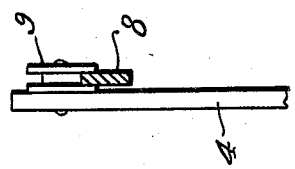
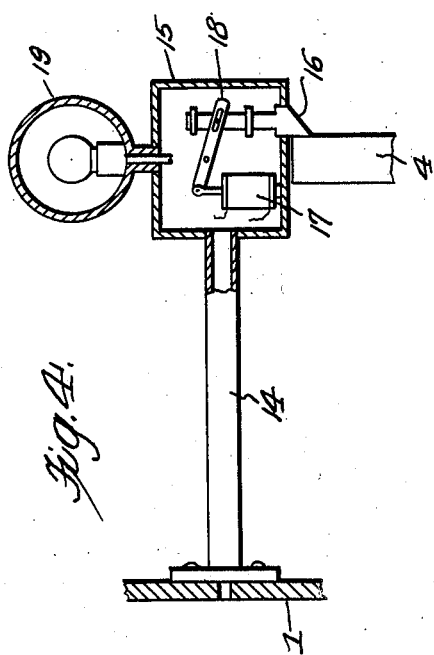
Inventor
*Moses E. Bennett,*
By *Clarence A. O'Brien & Lyman Berman* Attorneys Patented Mar. 19, 1940

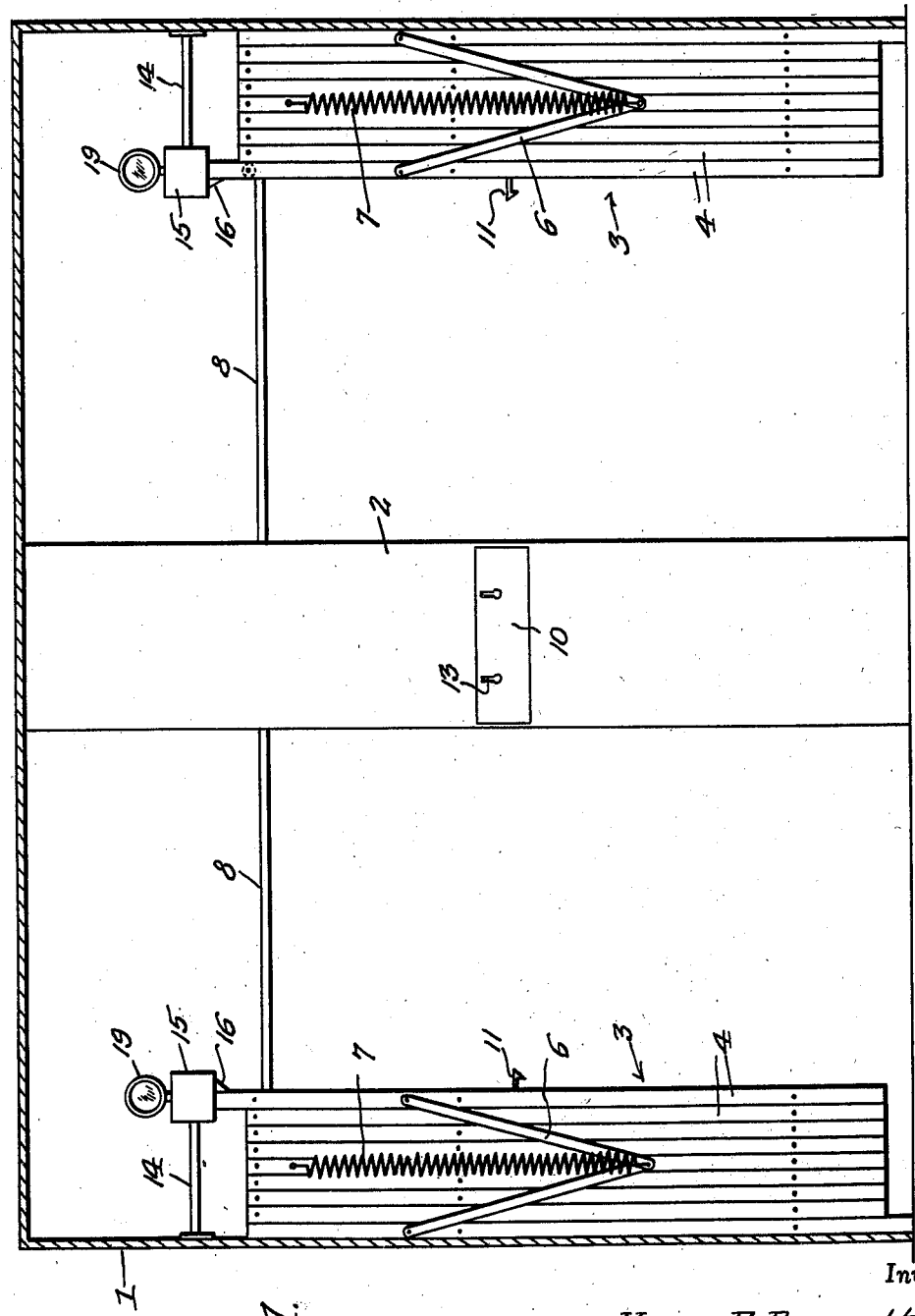

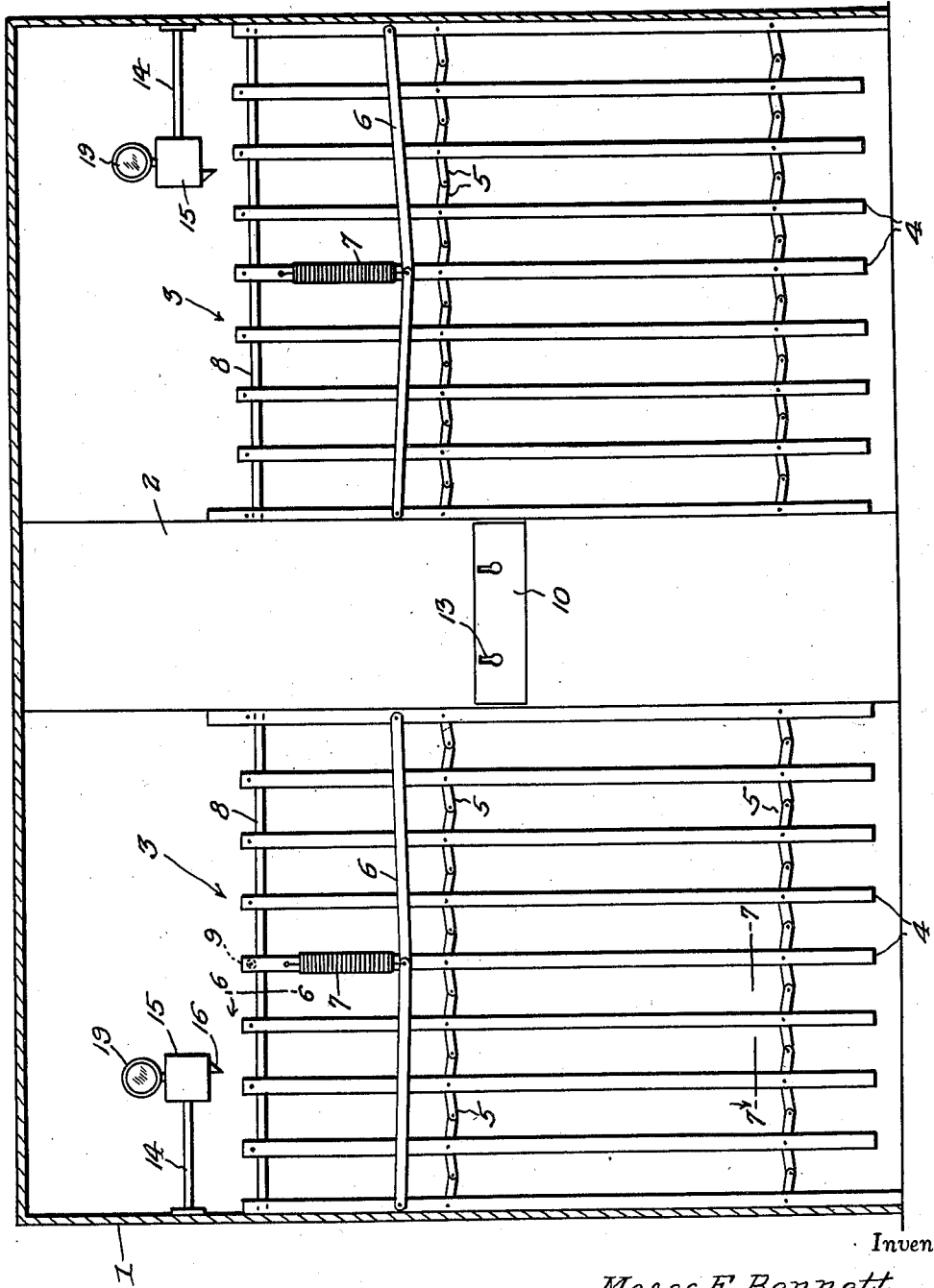

2,194,415

UNITED STATES PATENT OFFICE 2,194,415

BURGLAR TRAP

Moses Edwin Bennett, Detroit, Mich., assignor of one-half to Dotcy Isom, Detroit, Mich.

Application April 27, 1938, Serial No. 204,668

1 Claim. (Cl. 70—97)

The present invention relates to new and useful improvements in burglar traps for use particularly in banks and has for one of its important objects to provide, in a manner as hereinafter set forth, a trap of this character which is in the form of any desired number of normally open gates which may be instantly closed when desired from any one of a number of remote points for effectively preventing the escape of the burglar from the bank or other building.

Another important object of the invention is to provide a burglar trap of the aforementioned character embodying novel means for closing the gates when said gates are released, together with novel means for securing the gates in closed position.

Other objects of the invention are to provide a burglar trap of the character described which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in vertical longitudinal section through a burglar trap constructed in accordance with the present invention, showing the gates in open position.

Figure 2 is a vertical sectional view through the trap, showing the gates in closed position.

Figure 3 is a detail view in vertical section through the lock which secures the gates in closed position.

Figure 4 is a detail view principally in vertical section through one of the magnetically operated latches which secure the gates in open position.

Figure 5 is a detail view in perspective of the magnetically operated gate retaining bolt shown in Figure 4.

Figure 6 is a detail view in vertical section, taken substantially on the line 6—6 of Figure 2, showing the mounting of one of the gates on its track.

Figure 7 is a fragmentary view in horizontal section through one of the gates, taken substantially on the line 7—7 of Figure 2.

Referring now to the drawings in detail, it will be seen that the embodiment of the present invention which has been illustrated comprises a frame 1 of any suitable dimensions and material in the center of which a vertical column or post 2 is provided. As best seen in Figure 3 of the drawings, the column or post 2 is of hollow construction. The column or post 2 may be suitably ornamented and, if desired, a clock may be mounted in the upper portion thereof. The post 2 is provided with openings 20 in its sides.

Mounted in the frame 1 for operation on opposite sides of the post 2 are foldable gates which are designated generally by the reference numeral 3. Each gate 3 includes pairs of spaced slats 4 (see Figure 7) which are connected by pivoted links 5. The construction and arrangement is such that when the gates are in open position the links 5 fold between the pairs of slats 4 and the vertical edges of said slats are in abutting engagement with each other as shown to advantage in Figure 1 of the drawings. Toggles 6 are pivotally connected to the outer and inner pairs of slats 4 of each gate 3 and connected to the joints of said toggles 6 are coil springs 7 which yieldingly urge the gates toward closed position, as is believed to be apparent. One end of the coil springs 7 is connected to the adjacent slat of each gate.

The gates 3 are, of course, mounted on the side members of the frame 1, the outermost slats being fixed to said frame and being stationary. The gates 3 travel on tracks 8 which are provided therefor in the upper portion of the frame 1, said tracks extending from the sides of said frame to the post 2. As best seen in Figure 6 of the drawings, grooved rollers 9 are provided for suspending the slats 4 of the gates on the tracks 8.

Mounted at an intermediate point in the hollow post 2 is a casing 10 for the reception of hooks 11 on the free inner ends of the gates 3. Mounted on a vertical support 21 in the casing 10 is a double end resilient latch 12 which is engageable with the hooks 11 for securing the gates 3 in closed position. Openings 13 are provided in the front of the casing 10 for the insertion of a key for flexing the latch 12 when it is desired to release the gates. The casing 10 is further provided with openings 22 aligned with the post openings 20 for receiving the hooks 11.

Hollow arms 14 extend inwardly from the vertical sides of the frame 1 above the tracks 8 and mounted on the inner ends of said arms are housings 15. As illustrated to advantage in Figure 4 of the drawings, bolts 16 are mounted for vertical sliding movement in the housings 15, said bolts being engageable with the upper ends of the comparatively long innermost slats of the gates 3. The bolts 16 are operatively connected to electro-magnets 17 in the housings 15 by levers 18. Signal lights 19 are mounted on the housings 15.

Briefly, the operation of the invention is as follows:

The gates 3 are normally held in open position by the bolts 16, in which position the springs 7 are under tension, as suggested in Figure 1 of the drawings. The electro-magnets 17 are in circuit with any desired number of control switches located at remote points throughout the bank or other establishment. When one of the control switches is closed the electro-magnets 17 are energized for retracting the bolts 16 and releasing the gates, thus permitting the springs 7 to close the gates through the medium of the toggles 6. The signal lights 19 are energized simultaneously with the releasing of the gates. When the gates reach closed position, the hooks 11 on the free inner ends thereof enter the casing 10 and operatively engage the resilient double latch 12 for securing the gates in closed position, as hereinbefore explained. To release the gates, keys are inserted in the openings 13 and then rotated in a manner to function as cams for flexing the resilient latch 12 out of engagement with the hooks 11. When the electro-magnets 17 are deenergized, the bolts 16 return to projected or operative position for again retaining the gates in open position. If desired, the gates may be operatively connected with suitable electric signals located in police stations and at other points for indicating when the gates are closed. It is intended that the invention be interposed in a fence within the bank, the gates being aligned with the entrance to said bank.

It is believed that the many advantages of a burglar trap constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:

A lock for a burglar trap comprising a hollow post having openings in the sides thereof, a casing mounted in the post and having openings therein communicating with the first named openings, a vertical support in the casing, and a resilient latch secured intermediate its ends on the support, said latch having hooks on its ends for engaging and retaining complemental hooks on closures, the casing further having keyholes therein for the reception of a key for flexing the resilient latch to releasing position.

MOSES EDWIN BENNETT.